May 14, 1968  T. E. LOHR  3,383,535

ELECTRIC MOTOR

Filed March 3, 1965  5 Sheets-Sheet 1

INVENTOR.
THOMAS E. LOHR
BY C.R. Meland
ATTORNEY

May 14, 1968

T. E. LOHR 3,383,535

ELECTRIC MOTOR

Filed March 3, 1965

INVENTOR.
THOMAS E. LOHR
BY
C. R. Meland
ATTORNEY

May 14, 1968

T. E. LOHR 3,383,535

ELECTRIC MOTOR

Filed March 3, 1965

INVENTOR.
THOMAS E. LOHR

BY C.R. Meland

ATTORNEY

May 14, 1968 T. E. LOHR 3,383,535

ELECTRIC MOTOR

Filed March 3, 1965 5 Sheets-Sheet 4

INVENTOR.
THOMAS E. LOHR
BY C. R. Meland
ATTORNEY

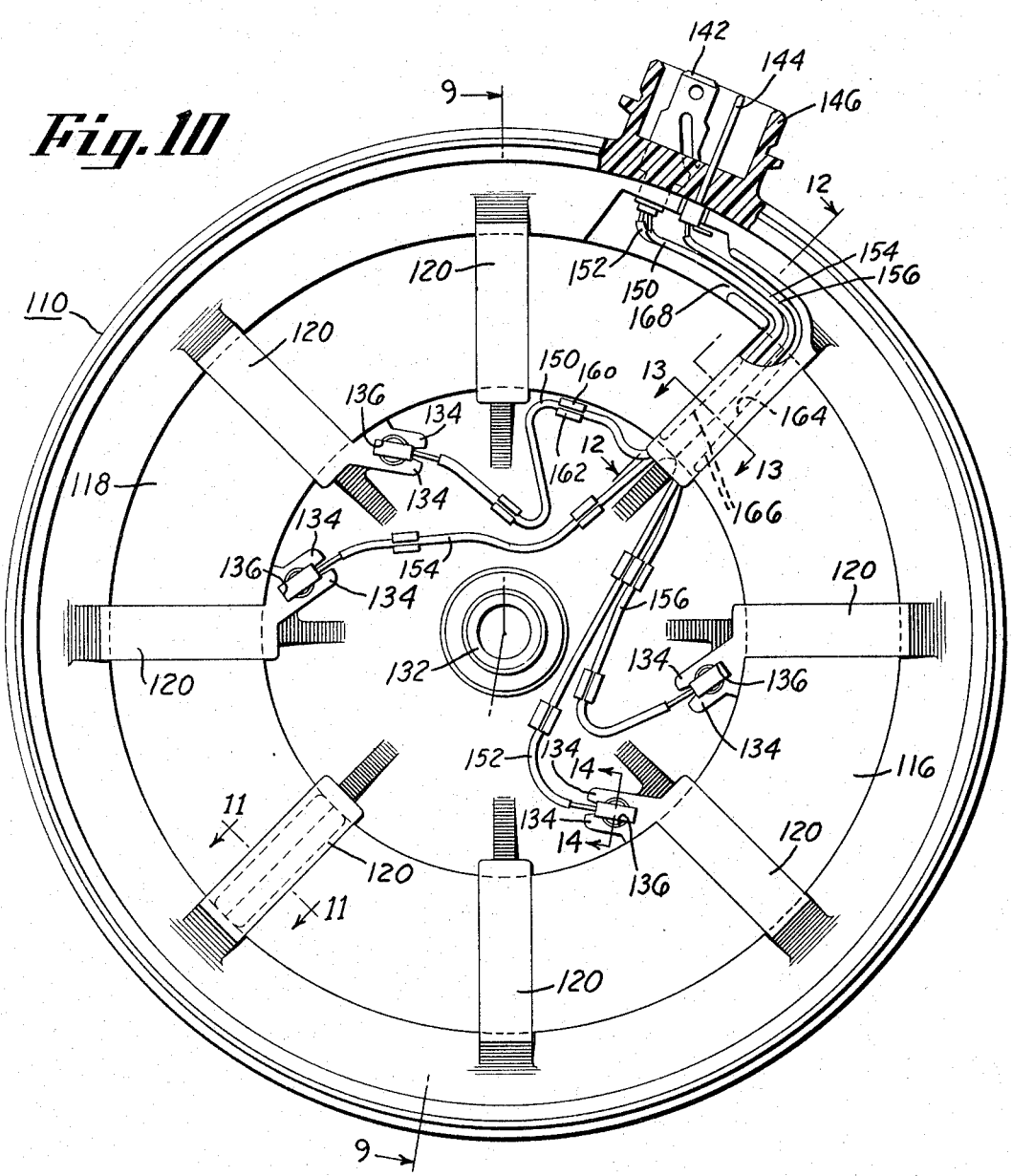

United States Patent Office 3,383,535
Patented May 14, 1968

3,383,535
ELECTRIC MOTOR
Thomas E. Lohr, Warren, Mich., assignor to General Motors Corporation, Detroit, Mich., a corporation of Delaware
Filed Mar. 3, 1965, Ser. No. 436,771
17 Claims. (Cl. 310—268)

This invention relates to an electric motor and more particularly to an electric motor of the axial air gap type.

One of the objects of this invention is to provide an electric motor which is compact in axial dimension.

Another object of this invention is to provide an electric motor which is economical to manufacture and which is capable of using a molded plastic part as the housing for the motor.

Still another object of this invention is to provide an improved brush rigging for an axial air gap motor of the type that has a permanent magnet field and a printed circuit armature.

Still a further object of this invention is to provide an improved field assembly for an axial air gap motor. In carrying this object forward, the field assembly includes a ceramic permanent magnet which has slots that receive ribs formed as an integral part of the motor housing. These ribs serve to retain and locate the permanent magnet and also serve to stiffen the motor housing. In addition, the ribs are adapted to provide an insulated area to connect brush lead wires to connector terminals and the field assembly of this invention is ideally suited for use with a molded plastic motor housing.

Still another object of this invention is to provide a permanent magnet motor that has a one-piece plastic molding which serves as the main support for the entire motor.

A further object of this invention is to provide an axial air gap motor where the housing of the motor is an annular plastic molding and where this housing supports magnetic end bells that in turn support the armature of the motor.

Still another object of this invention is to provide a motor of the axial air gap type that has a one-piece housing having integral brush holding chambers for accommodating brushes that engage a printed circuit armature.

A further object of this invention is to provide a motor of the axial air gap type where the brush holders are integral with the housing of the motor and where the brush springs are supported by integral extensions of the motor housing.

Another object of this invention is to provide an electric motor with a printed circuit board which is adapted to supply current to a plurality of brushes in the electric motor.

Further objects and advantages of the present invention will be apparent from the following description, reference being had to the accompanying drawings wherein preferred embodiments of the present invention are clearly shown.

In the drawings:

FIGURE 10 is a plan view of the motor illustrated in FIGURE 9 with one of the end bells and the armature removed to illustrate the brushes and field assembly of the motor.

Figure 1:
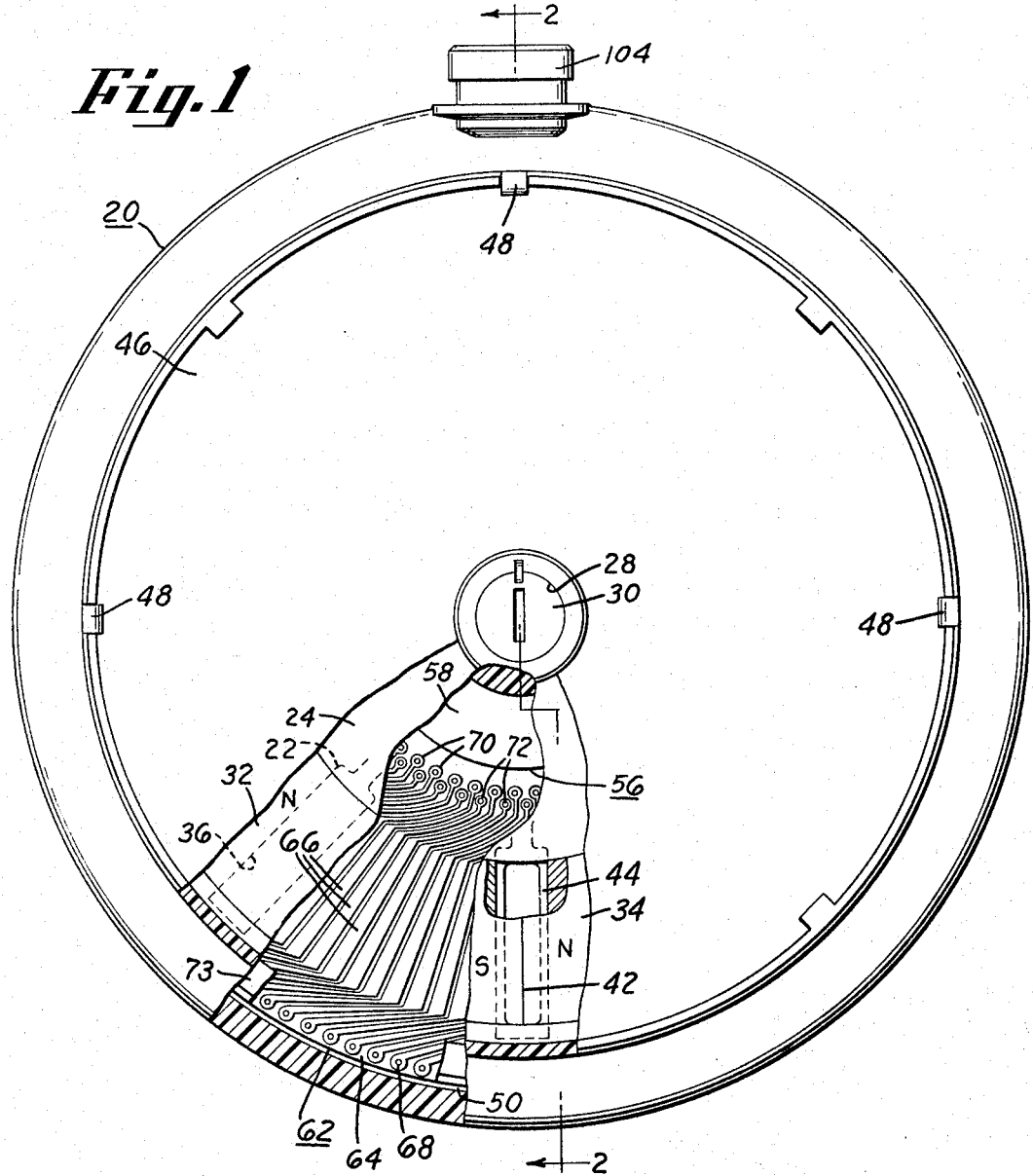
FIGURE 1 is an end view with parts broken away of a motor made in accordance with this invention.
Figure 2:
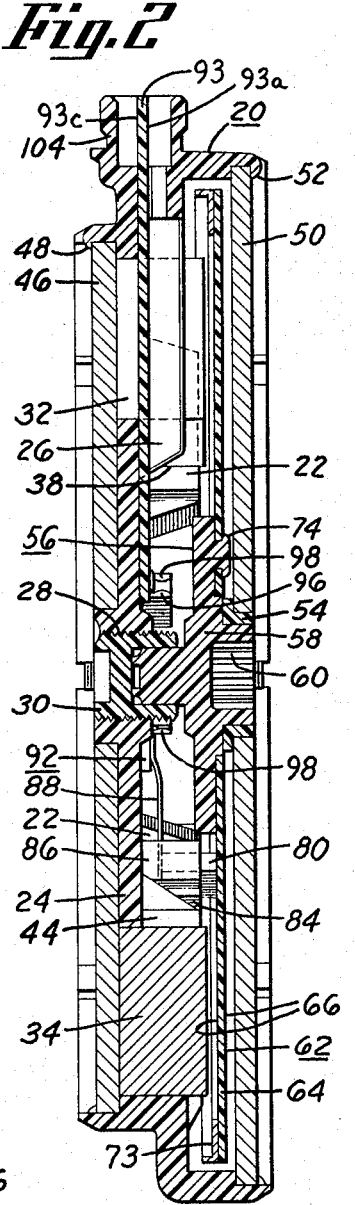
FIGURE 2 is a sectional view taken along line 2—2 of FIGURE 1.
Figure 3:
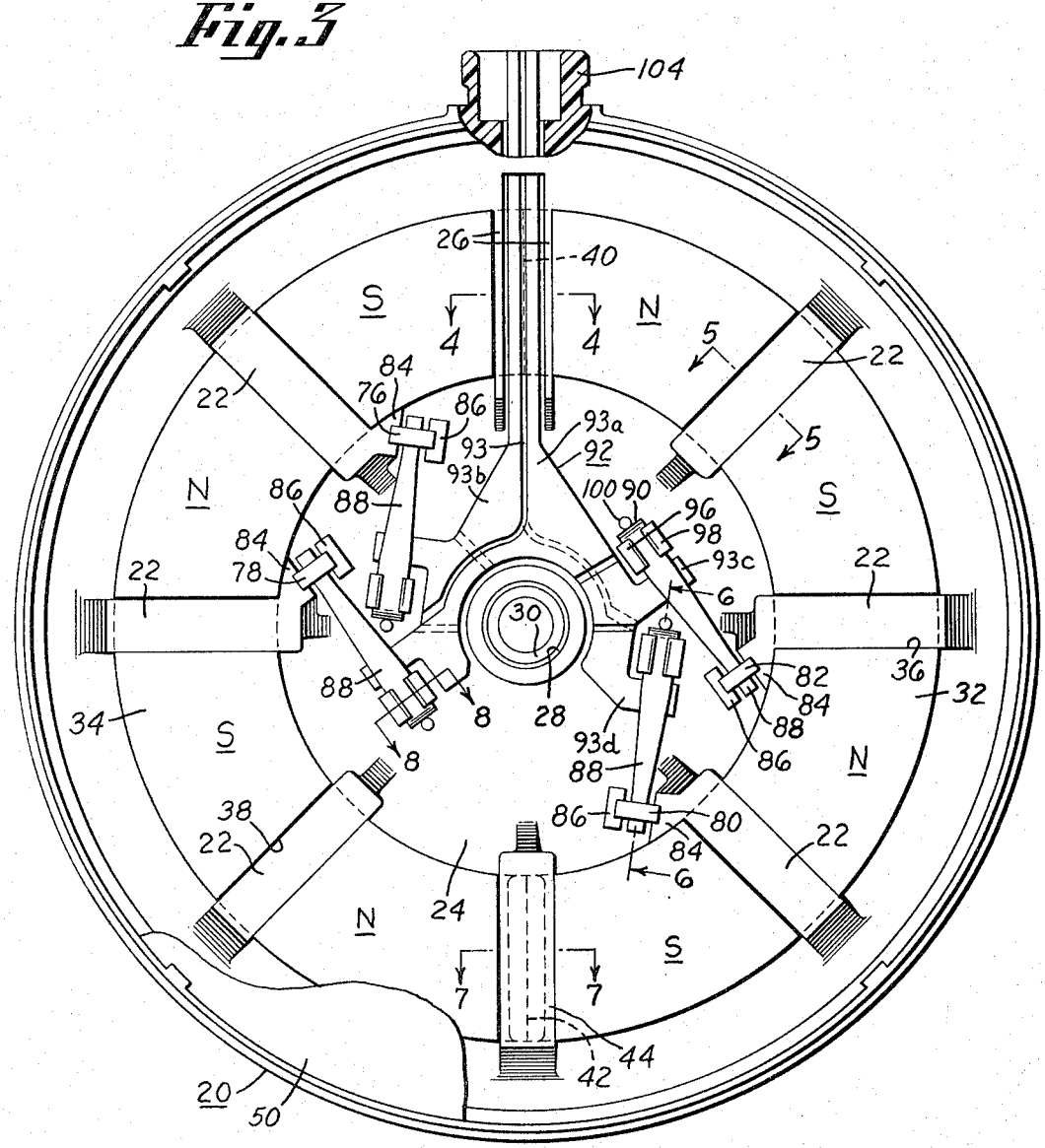
FIGURE 3 is an end view of the motor shown in FIGURE 1 with the armature and one of the end bells removed to illustrate the brush rigging and permanent magnets of the motor.
Figure 11:
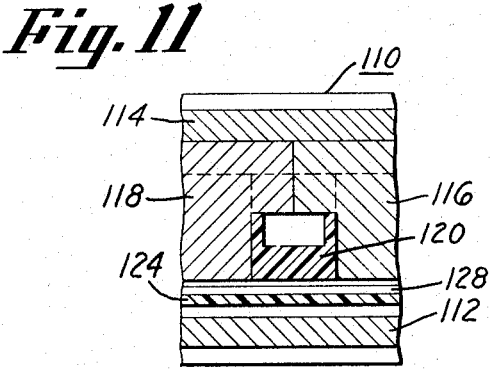
FIGURE 11 is a sectional view taken along line 11—11 of FIGURE 10.

Referring now to the drawings and more particularly to FIGURES 1 through 3, the electric motor of this invention is illustrated at double scale and includes an annular housing generally designated by reference numeral 20. This housing is a molded part and is formed of a suitable plastic material such as Delrin acetal resin. The housing 20 has a plurality of radially extending ribs 22 which connect the outer annular section of the housing with a central disk shaped section 24. The housing 20 also has ribs 26 which connect the outer annular section of the housing and the center section 24. The ribs 26 are illustrated in the sectional view of FIGURE 4.

The central section 24 of the housing 20 has a threaded opening 28 which receives a plastic thrust plug 30. The thrust plug 30 is threaded into the opening 28 and the purpose of this plug is more fully described hereinafter.

Figure 5:
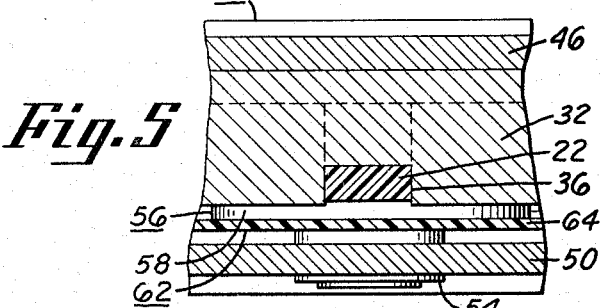
FIGURE 5 is a sectional view taken along line 5—5 of FIGURE 3.

The electric motor has two permanent magnets designated respectively by reference numerals 32 and 34. These magnets are arcuately shaped as shown in FIGURE 3 and have slots 36 and 38 for receiving the ribs 22 of the housing 20. This is better illustrated in FIGURE 5 where it is seen that the rib 22 fits within the slot 36 formed in the permanent magnet 32.

Figure 4:
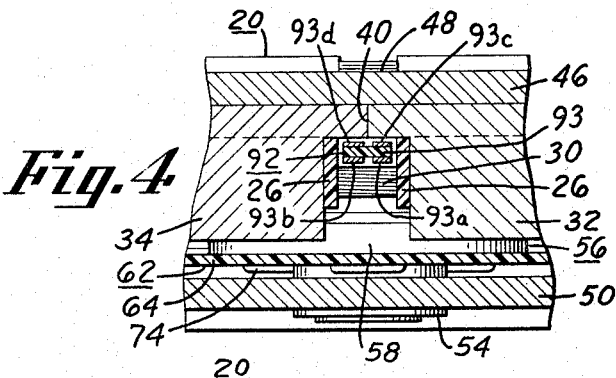
FIGURE 4 is a sectional view taken along line 4—4 of FIGURE 3.
Figure 7:
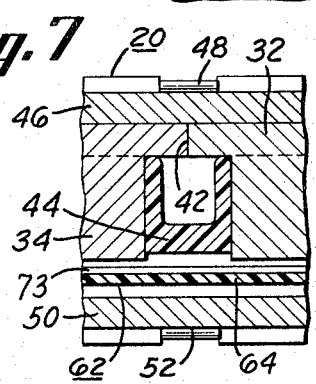
FIGURE 7 is a sectional view taken along line 7—7 of FIGURE 3.

The ends of the permanent magnets engage each other at points 40 and 42 as can be seen from FIGURES 4 and 7. One of the ribs 44 of the housing 20 is hollow as can be seen from FIGURE 7.

The permanent magnets 32 and 34 can be molded to the shape illustrated in the drawings and preferably are ceramic ferrite permanent magnets formed of a magnetic material having a low permeability and a higher coercivity. One type of material that is suitable is a barium ferrite magnetic material.

The permanent magnets 32 and 34 are magnetized to provide magnetized sectors between the slots formed in the permanent magnets and having the polarity indicated in FIGURE 3. Thus the permanent magnets are magnetized to have alternate opposite polarity sectors and this can be accomplished by magnetizing the ferrite composition by a magnetizing fixture which permanently magnetizes the sectors between the slots 36. The magnetizer can be of a pulse type which is capable of magnetizing ferrite material.

The arcuate permanent magnets 32 and 34 are held between the ribs 22 of the housing 20 and a magnetic mild steel end bell 46. The end bell 46 is secured to the plastic housing 20 by hot staking certain portions of the housing 20 as at 48. It is seen that one side of the end bell 46 engages one flat end wall of the magnets 32 and 34 and the arcuate magnets are held fixed relative to the housing by the ribs 22 which fit within the slots 36 and 38 formed in the permanent magnets. With this arrangement, the permanent magnets are positively located relative to the housing and the ribs 22 also serve to stiffen the housing.

The opposite end of the housing 20 is closed by another magnetic member 50 which is preferably formed of mild steel. The end bell 50 is fixed to the housing 20 by hot staking the housing at various points designated by reference numeral 52. The end bell 50 has a central opening which receives a plastic bearing bushing designated by reference numeral 54.

The bushing 54 and the thrust plug 30 serves to rotatably support an armature assembly generally designated by reference numeral 56. This armature assembly includes an armature shaft 58 which is formed of plastic material and which has sections journalled respectively in the thrust plug 30 and in the bushing 54. The armature shaft 58 is adapted to drive a device to be operated by the motor and has internal teeth 60 which can be connected with a device to be driven.

The armature shaft 58 carries a printed circuit armature generally designated by reference numeral 62. The armature 62 is formed of a sheet of insulated material 64 which may be, for example, a raw phenolic sheet known in the trade as Mylar. The insulator board 64 carries printed circuit conductors on opposite sides. The conductors on one side of the insulator board 64 are designated by reference numerals 66 in FIGURE 1. The conductors 66 on one side of the insulator board 64 are connected with the conductors on the opposite side of the insulator board at points 68, 70 and 72. This connection can be made in various manners which form no part of the present invention.

The conductors on the opposite sides of the insulator board are wound to provide a wave winding with a half turn being disposed on each side of the insulator board. The printed circuit conductors can be manufactured by known printed circuit techniques which form no part of the present invention.

The printed circuit armature 62 carries an annular stiffener ring designated by reference numeral 73. This stiffener ring is formed of a nonmagnetic material such as aluminum or stainless steel. This stiffening ring is cemented to the armature 62 and sufficient cement must be applied so as to insulate the stiffening ring from the printed circuit conductors when the stiffening ring is formed of electrically conductive material. The stiffening ring is used to insure flatness of the armature and to provide armature balance.

The armature 62 is secured to the armature shaft 58 by passing integral extensions of the armature shaft through openings in the armature 62 and then hot staking these openings as is indicated by reference numeral 74. It is to be understood that a plurality of extensions 74 are required in order to hold the printed circuit board 62 fixed to the armature shaft 58.

The motor of this invention uses the printed circuit conductors, for example, conductors 66 on one face of the armature as a commutator for the motor. These conductors are engaged by brushes designated by reference numerals 76, 78, 80 and 82. The brushes are slidably disposed within integral parts 84 and 86 of the housing.

Figure 6:
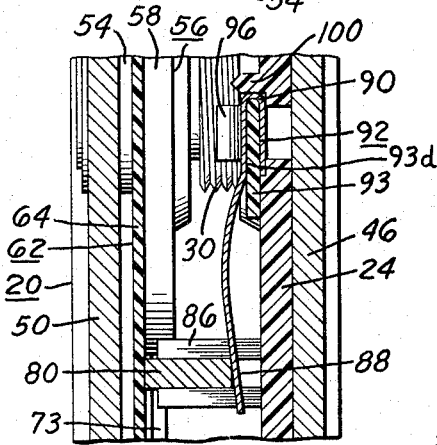
FIGURE 6 is a sectional vew taken along line 6—6 of FIGURE 3.
Figure 8:
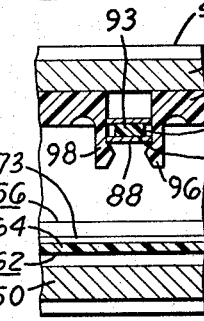
FIGURE 8 is a sectional view taken along line 8—8 of FIGURE 3.

The brushes 76 through 82 are urged against the printed circuit conductors on one face of the armature 62 by leaf springs 88. One of the leaf springs is illustrated in the sectional view of FIGURE 6 and it is seen that one end of the leaf spring has a U-shaped section 90 that fits around a printed circuit board 92. This U-shaped section 90 fits between the ribs 96 and 98 which are integral with the housing as is illustrated in FIGURE 8 and engages opposite sides of the printed circuit board 92. The end of the U-shaped section 90 engages circular ribs 100. The end of the leaf spring 88 opposite from the U-shaped section 90 engages a brush to urge the brush against the printed circuit armature 62 as can be seen in FIGURE 6.

The printed circuit board 92 includes a sheet or panel 93 which is formed of insulating material. The sheet of insulating material 93 carries printed circuit conductor sections 93a, 93b, 93c and 93d. These printed circuit conductor sections are illustrated in FIGURE 3. The side of the printed circuit panel 93 opposite from the side shown in FIGURE 3 has the same pattern of conductors when viewed from the opposite side as is indicated by the dotted lines on the printed circuit board 92 of FIGURE 3.

It is seen that one portion of the printed circuit board 92 extends between the ribs 26 and into an annular receptacle section 104 which is integral with the plastic housing. The portion that projects through the ribs 26 and into the receptacle section 104 forms a male terminal and is connected with a battery by means of a female connector that has means for engaging the printed circuit conductors on opposite sides of the printed circuit board 92. The arrangement of printed circuit conductors on panel 93 is such that brushes 78 and 82 are connected with one side of the battery and brushes 76 and 80 are connected with an opposite side of the battery.

In operation, the magnets 32 and 34 provide the magnetic field for the motor which reacts with the magnetic field provided by current flow through the conductors 66 of the printed circuit armature 62. The flux flow for the magnetic field is, for example, from the sectors of the magnets which are magnetized as north poles, through the printed circuit armature 62, then through the mild steel end bell 50, then back through the armature to the sectors which are magnetized as south poles and then through the mild steel end bell 46. It therefore is seen that the magnetic field is axially directed in passing between the adjacent end faces of the magnetized sectors and through the mild steel end bell 50.

When current is supplied to the printed circuit armature, the armature will rotate and the armature shaft will rotate within the bushing 54 and the thrust plug 30. The armature 58 can be used to drive various devices and may be used to adjust a window in a motor vehicle.

Referring now to FIGURES 9 through 14, a modified axial air gap motor is illustrated which is made in accordance with this invention. This motor in many respects is identical with the motor shown in FIGURES 1 through 3 but has a different brush rigging and a different method of connecting the brushes with an external power source.

It is seen that the motor of FIGURES 9 through 14 includes a plastic housing designated by reference numeral 110. This housing supports the magnetic end bells 112 and 114 which are formed of mild steel. The housing 110 and the end bell 114 hold the permanent magnets 116 and 118 fixed with respect to the housing and these magnets are of the same type as used in the motor shown in FIGURE 3. The housing 110 has ribs 120 which fit within slots formed in the magnets 116 and 118.

The armature shaft 112 is secured to a printed circuit armature 124 which is of the same type as that illustrated in FIGURE 3. The printed circuit armature 124 is secured to the plastic armature shaft 122 by a plurality of rivets 126. The printed circuit armature 124 carries a stiffening ring 128 and the armature shaft 122 is journalled in the bushing 130 and in the thrust plug 132.

It will be appreciated from the foregoing description that the motor of FIGURES 9 through 14 as thus far described is substantially identical with the motor of FIGURE 3 with the exception of the method of connecting the printed circuit armature to the armature shaft.

Figure 14:
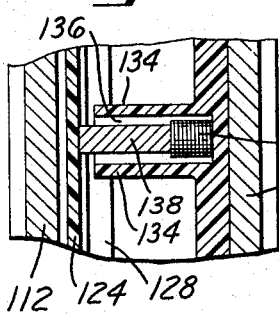
FIGURE 14 is a sectional view taken along line 14—14 of FIGURE 10.

The housing 110 has integral bosses 134 that form chambers 136. The chambers 136, as is best illustrated in FIGURE 14, contains a brush 138 and a coil spring 140 which urges the brush against the printed circuit conductors on the printed circuit armature 124. There are four brushes as is seen from FIGURE 10 and each brush is urged against the printed circuit board by a coil spring of the type shown in FIGURE 14.

Figure 12:
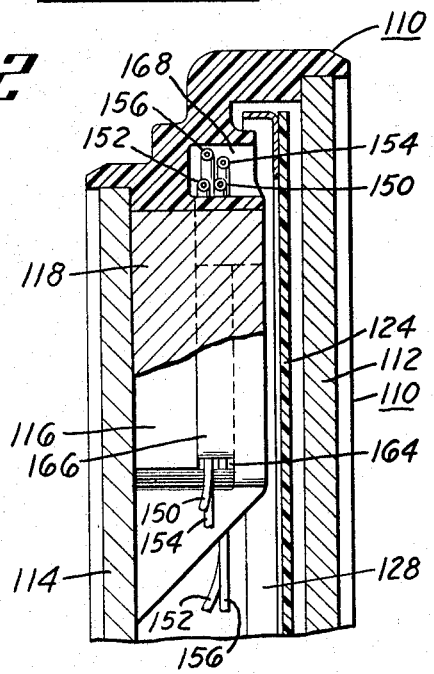
FIGURE 12 is a sectional view taken along line 12—12 of FIGURE 10.
Figure 9:
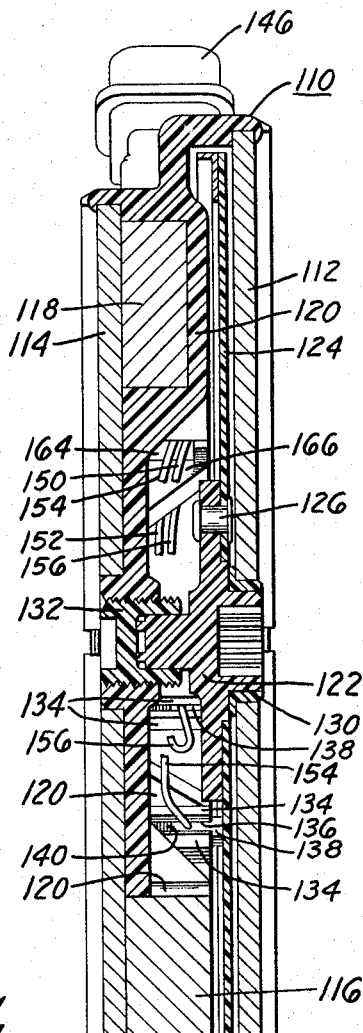
FIGURE 9 is a sectional view of a modified motor made in accordance with this invention and taken along line 9—9 of FIGURE 10.
Figure 13:
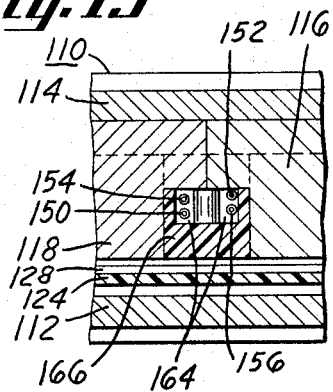
FIGURE 13 is a sectional view taken along line 13—13 of FIGURE 10.

The brushes 136 are connected with the male terminals 142 and 144 which are snap fitted to openings formed in the housing 110. The male terminals 142 and 144 are located within a receptacle section 146 of the housing 110 and these terminals are adapted to fit in a complementary female terminal which electrically connects the terminals with opposite sides of a source of direct current such as a battery. The male terminal 142 is connected with conductors 150 and 152 which in turn are connected to two of the brushes 136. The conductors 154 and 156 connect the male terminal 144 with two of the other brushes. The conductors are positioned within lugs, for example, lugs 160 and 162 which are integral with the housing 110 and all of the conductors pass through a channel 164 formed in the rib 166 of the housing 110. This rib and the conductors are best illustrated in FIGURE 13. The conductors also pass through a channel 168 which is illustrated in FIGURE 12.

Although each motor embodiment is shown using two arcuate magnet sections, it will be appreciated by those skilled in the art that one annular magnet could be provided having slots which receive the ribs of the motor housing.

While the embodiments of the present invention as herein disclosed constitute a preferred form, it is to be understood that other forms might be adopted.

What is claimed is as follows:

1. An electric motor of the axial air gap type comprising, a housing, a field assembly including flux generating means, said field assembly having a plurality of radially extending slots, said housing having a plurality of ribs fitting within said slots for positioning said field assembly relative to said housing, and an armature rotatably supported by said housing having an end face located in alignment with an end face of said field assembly.

2. An electric motor of the axial air gap type comprising, a support, said support having a plurality of radially extending ribs, a permanent magnet having a plurality of slots receiving said ribs whereby said permanent magnet is positioned relative to said support, and an armature rotatably supported by said support having an end face located in alignment with an end face of said permanent magnet.

3. The electrical motor according to claim 2 where the armature is of the printed circuit type.

4. The electric motor according to claim 2 where the permanent magnet is formed of ferrite material and is magnetized to provide alternate opposite polarity sectors.

5. An electric motor comprising, a housing having an outer annular section and a central section, a plurality of radially extending ribs connecting said outer annular section and said central section, an end plate formed of magnetic material supported by said annular section, a permanent magnet disposed between said ribs and said end plate having slots that receive said ribs, a second end plate formed of magnetic material supported by said annular section of said housing, and an armature located between said permanent magnet and said second end plate supported for rotation by said second end plate and said central section.

6. The electric motor according to claim 5 where the housing is a one-piece plastic molding.

7. The electric motor according to claim 5 where the permanent magnet is formed of ferrite material and has alternate areas magnetized with opposite polarities.

8. The electric motor according to claim 5 where the armature has printed circuit conductors.

9. The electric motor comprising, a housing formed of electric insulating material, said housing having a central section and an outer annular section, a plurality of ribs joining said central section and said annular section, an end plate formed of magnetic material supported by said annular section of said housing, a permanent magnet disposed between said end plate and said ribs, a second end plate formed of magnetic material supported by said annular section of said housing, and an armature positioned between said ribs and said second end plate, said armature being rotatably supported and including a plurality of radially extending conductors, and brushes slidably supported by portions of said housing engageable with the conductors of said armature.

10. The electric motor according to claim 9 where the permanent magnet is arcuately shaped and has a plurality of radially extending slots which receive the ribs of said housing.

11. The electric motor according to claim 9 where the armature conductors are formed as a printed circuit on an insulator.

12. An electric motor comprising, a housing, a flux generating means supported by said housing, an armature rotatable adjacent said flux generating means including a plurality of radially extending printed circuit conductors, a plurality of brushes engaging said armature, a printed circuit board having a male terminal section for connection to an external power source supported by said housing, and a plurality of leaf springs for urging said brushes into engagement with said radially extending conductors of said armature, said leaf springs electrically connecting said printed circuit board and said brushes.

13. An electric motor comprising, a housing having an outer annular section and a central section, a plurality of ribs connecting said outer annular section and said central section, a flux generating means supported by said housing, said flux generating means having slots receiving said ribs, an armature rotatable adjacent said flux generating means, a plurality of brushes supported by said housing engaging said armature, terminal means supported by said housing adapted to be connected with a source of power, and conductors connecting said terminal means and said brushes, said conductors passing through one of said ribs.

14. An electric motor of the axial air gap type comprising, a housing formed of insulating material, said housing having outer and inner sections connected by radially extending ribs, first and second end bells carried by said housing formed of magnetic material, a permanent magnet located between said ribs and one of said end bells, said permanent magnet having slots receiving said ribs, an armature of the printed circuit type rotatably supported and positioned between said ribs and said second end bell, a plurality of brush holders formed integrally with said housing, brushes positioned within said brush holders engaging said printed circuit armature, a printed circuit board supported by said housing adapted to be connected with a source of electrical power, and a plurality of leaf springs for urging said brushes into engagement with said armature, said leaf springs being supported by said housing and electrically connecting said printed circuit board and said brushes.

15. The electric motor according to claim 14 where each leaf spring has a U-shaped section which engages opposite sides of said printed circuit board.

16. The electric motor according to claim 14 where the permanent magnet is formed of a ferrite composition and has alternate areas magnetized with opposite polarities.

17. The electric motor according to claim 14 where the printed circuit armature carries a stiffening ring which is adhesively secured to one edge of said armature.

References Cited

UNITED STATES PATENTS

| | | | |
|---|---|---|---|
| 2,773,306 | 11/1956 | Ranson | 30—43 |
| 3,167,675 | 1/1965 | Vindevoger | 310—239 |

MILTON O. HIRSHFIELD, *Primary Examiner.*

R. W. TEMPLETON, *Assistant Examiner.*